(12) United States Patent
Dreissig et al.

(10) Patent No.: US 8,223,473 B2
(45) Date of Patent: Jul. 17, 2012

(54) ELECTROLYTIC CAPACITOR CONTAINING A LIQUID ELECTROLYTE

(75) Inventors: Dirk H. Dreissig, Myrtle Beach, SC (US); John Galvagni, Hendersonville, NC (US)

(73) Assignee: AVX Corporation, Myrtle Beach, SC (US)

( * ) Notice: Subject to any disclaimer, the term of this patent is extended or adjusted under 35 U.S.C. 154(b) by 494 days.

(21) Appl. No.: 12/408,900

(22) Filed: Mar. 23, 2009

(65) Prior Publication Data

US 2010/0238608 A1 Sep. 23, 2010

(51) Int. Cl.
*H01G 9/00* (2006.01)

(52) U.S. Cl. ........ 361/505; 361/503; 361/504; 361/506; 361/508

(58) Field of Classification Search .................. 361/503, 361/504, 505, 506, 508
See application file for complete search history.

(56) References Cited

U.S. PATENT DOCUMENTS

| | | |
|---|---|---|
| 3,082,360 A | 3/1963 | Robinson et al. |
| 3,138,746 A | 6/1964 | Burger et al. |
| 3,835,055 A | 9/1974 | Chesnot |
| 4,031,436 A | 6/1977 | Alwitt |
| 4,121,949 A | 10/1978 | Walters |
| 4,408,257 A | 10/1983 | Walters |
| 4,466,841 A | 8/1984 | Walters |
| 4,469,610 A | 9/1984 | Fukuda et al. |
| 4,494,174 A | 1/1985 | Schroeder |
| 4,523,255 A | 6/1985 | Rogers |
| 4,535,389 A | 8/1985 | Buczkowski et al. |
| 4,654,279 A | 3/1987 | Bauer et al. |
| 4,683,516 A | 7/1987 | Miller |
| 4,774,011 A | 9/1988 | Mori et al. |
| 4,780,797 A | 10/1988 | Libby |
| 4,992,910 A | 2/1991 | Evans |
| 5,043,849 A | 8/1991 | Libby |
| 5,045,170 A | 9/1991 | Bullock et al. |
| 5,098,485 A | 3/1992 | Evans |
| 5,105,341 A | 4/1992 | Stephenson et al. |

(Continued)

FOREIGN PATENT DOCUMENTS

EP 0989572 A2 3/2000

(Continued)

OTHER PUBLICATIONS

Abstract of Japanese Patent No. JP1158715, Jun. 21, 1989.

(Continued)

*Primary Examiner* — Nguyen T Ha
*Assistant Examiner* — Hung Dang
(74) *Attorney, Agent, or Firm* — Dority & Manning, P.A.

(57) ABSTRACT

An electrolytic capacitor that contains an anodically oxidized porous anode, cathode, and an electrolyte that contains an alkali metal salt and ionically conductive polymer is provided. The alkali metal salt forms a complex with the ionically conductive polymer and thereby improves its ionic conductivity, particularly at higher temperatures. The electrolyte also contains an organic solvent that reduces the viscosity of the electrolyte and helps lower the potential barrier to metal ion transport within the electrolyte to improve conductivity. By selectively controlling the relative amount of each of these components, the present inventors have discovered that a highly ionically conductive electrolyte may be formed that is also in the form of a viscous liquid. The liquid nature of the electrolyte enables it to more readily enter the pores of the anode via capillary forces and improve specific capacitance. Further, although a liquid, its viscous nature may inhibit the likelihood of leakage.

18 Claims, 9 Drawing Sheets

U.S. PATENT DOCUMENTS

| | | |
|---|---|---|
| 5,136,474 A | 8/1992 | Sarangapani et al. |
| 5,160,653 A | 11/1992 | Clouse et al. |
| 5,369,547 A | 11/1994 | Evans |
| 5,378,550 A | 1/1995 | Doddapaneni et al. |
| 5,400,211 A | 3/1995 | Evans |
| 5,419,824 A | 5/1995 | Weres et al. |
| 5,419,977 A | 5/1995 | Weiss et al. |
| 5,469,325 A | 11/1995 | Evans |
| 5,485,346 A * | 1/1996 | Kanbara et al. ............... 361/504 |
| 5,495,386 A | 2/1996 | Kulkarni |
| 5,687,057 A | 11/1997 | Dapo |
| 5,726,118 A | 3/1998 | Ivey et al. |
| 5,737,181 A | 4/1998 | Evans |
| 5,754,394 A | 5/1998 | Evans et al. |
| 5,777,428 A | 7/1998 | Farahmandi et al. |
| 5,786,555 A | 7/1998 | Saito et al. |
| 5,786,980 A | 7/1998 | Evans |
| 5,858,911 A | 1/1999 | Wellen et al. |
| 5,894,403 A | 4/1999 | Shah et al. |
| 5,920,455 A | 7/1999 | Shah et al. |
| 5,926,362 A | 7/1999 | Muffoletto et al. |
| 5,973,913 A | 10/1999 | McEwen et al. |
| 5,982,609 A | 11/1999 | Evans |
| 5,985,477 A | 11/1999 | Iwasaki et al. |
| 5,986,876 A | 11/1999 | Stepanov et al. |
| 6,059,847 A | 5/2000 | Farahmandi et al. |
| 6,072,692 A | 6/2000 | Hiratsuka et al. |
| 6,080,282 A | 6/2000 | Kolb et al. |
| 6,094,339 A | 7/2000 | Evans |
| 6,094,788 A | 8/2000 | Farahmandi et al. |
| 6,104,600 A | 8/2000 | Suhara et al. |
| 6,128,179 A | 10/2000 | Morokuma |
| 6,181,546 B1 | 1/2001 | Stepanov et al. |
| 6,208,502 B1 | 3/2001 | Hudis et al. |
| 6,219,222 B1 | 4/2001 | Shah et al. |
| 6,224,985 B1 | 5/2001 | Shah et al. |
| 6,248,480 B1 | 6/2001 | Narang et al. |
| 6,296,783 B1 | 10/2001 | Shindo et al. |
| 6,301,093 B1 | 10/2001 | Noguchi et al. |
| 6,309,428 B1 | 10/2001 | Niiori et al. |
| 6,310,765 B1 | 10/2001 | Tanahashi et al. |
| 6,322,912 B1 | 11/2001 | Fife |
| 6,332,900 B1 | 12/2001 | Muffoletto et al. |
| 6,334,879 B1 | 1/2002 | Muffoletto et al. |
| 6,373,685 B1 | 4/2002 | Kimmel et al. |
| 6,377,442 B1 | 4/2002 | Strange et al. |
| 6,391,275 B1 | 5/2002 | Fife |
| 6,414,837 B1 | 7/2002 | Sato et al. |
| 6,426,863 B1 | 7/2002 | Munshi |
| 6,442,015 B1 | 8/2002 | Niiori et al. |
| 6,452,784 B2 | 9/2002 | Nakada et al. |
| 6,455,108 B1 | 9/2002 | Muffoletto et al. |
| 6,468,605 B2 | 10/2002 | Shah et al. |
| 6,479,581 B1 | 11/2002 | Ireland et al. |
| 6,507,480 B2 | 1/2003 | Nomoto et al. |
| 6,510,042 B1 | 1/2003 | Lee et al. |
| 6,522,523 B2 | 2/2003 | Takatomi et al. |
| 6,560,089 B2 | 5/2003 | Miltich et al. |
| 6,562,255 B1 | 5/2003 | Feger |
| 6,576,365 B1 | 6/2003 | Meitav et al. |
| 6,576,524 B1 | 6/2003 | Evans et al. |
| 6,594,139 B2 | 7/2003 | Muffoletto et al. |
| 6,594,140 B2 | 7/2003 | Evans et al. |
| 6,603,654 B2 | 8/2003 | Rorvick et al. |
| 6,614,646 B2 | 9/2003 | Bogaki et al. |
| 6,621,685 B1 | 9/2003 | Cho et al. |
| 6,645,675 B1 | 11/2003 | Munshi |
| 6,648,928 B2 | 11/2003 | Nielsen et al. |
| 6,652,729 B2 | 11/2003 | Melody et al. |
| 6,660,583 B2 | 12/2003 | Fujino et al. |
| 6,687,116 B2 | 2/2004 | Hudis |
| 6,687,117 B2 | 2/2004 | Liu et al. |
| 6,707,660 B1 | 3/2004 | Evans et al. |
| 6,721,169 B2 | 4/2004 | Melody et al. |
| 6,721,170 B1 | 4/2004 | Evans et al. |
| 6,727,024 B2 | 4/2004 | Kang et al. |
| 6,743,370 B1 * | 6/2004 | Feger et al. ................... 252/62.2 |
| 6,744,619 B1 | 6/2004 | Feger |
| 6,758,868 B2 | 7/2004 | Munshi |
| 6,761,728 B2 | 7/2004 | Harguth et al. |
| 6,765,785 B2 | 7/2004 | Honda et al. |
| 6,788,027 B2 | 9/2004 | Malik |
| 6,788,523 B1 | 9/2004 | Hossick-Schott et al. |
| 6,790,556 B1 | 9/2004 | Meitav et al. |
| 6,801,424 B1 | 10/2004 | Nielsen et al. |
| 6,802,951 B2 | 10/2004 | Hossick-Schott |
| 6,807,048 B1 | 10/2004 | Nielsen et al. |
| 6,819,544 B1 | 11/2004 | Nielsen et al. |
| 6,827,879 B2 | 12/2004 | Shinozaki et al. |
| 6,842,328 B2 | 1/2005 | Schott et al. |
| 6,850,405 B1 | 2/2005 | Mileham et al. |
| 6,859,353 B2 | 2/2005 | Elliott et al. |
| 6,859,354 B2 | 2/2005 | Viste et al. |
| 6,862,168 B2 | 3/2005 | Ando et al. |
| 6,885,545 B2 | 4/2005 | Michel et al. |
| 6,888,717 B2 | 5/2005 | Kinard et al. |
| 6,914,768 B2 | 7/2005 | Matsumoto et al. |
| 6,937,460 B2 | 8/2005 | Lang |
| 6,939,774 B2 | 9/2005 | Viste |
| 6,942,819 B2 | 9/2005 | Ebel et al. |
| 6,963,482 B2 | 11/2005 | Breyen et al. |
| 6,965,510 B1 | 11/2005 | Liu et al. |
| 6,967,829 B2 | 11/2005 | Seitz et al. |
| 7,002,790 B2 | 2/2006 | Hossick-Schott et al. |
| 7,012,799 B2 | 3/2006 | Muffoletto et al. |
| 7,022,264 B2 | 4/2006 | Takeuchi et al. |
| 7,038,901 B2 | 5/2006 | Muffoletto et al. |
| 7,072,171 B1 | 7/2006 | Muffoletto et al. |
| 7,079,377 B2 | 7/2006 | Schott et al. |
| 7,081,141 B2 | 7/2006 | Hossick-Schott et al. |
| 7,085,126 B2 | 8/2006 | Muffoletto et al. |
| 7,092,242 B1 | 8/2006 | Gloss et al. |
| 7,099,143 B1 | 8/2006 | Fife et al. |
| 7,110,240 B2 | 9/2006 | Breyen et al. |
| 7,116,547 B2 | 10/2006 | Seitz et al. |
| 7,116,548 B2 | 10/2006 | Satterfield, Jr. et al. |
| 7,131,988 B2 | 11/2006 | Harguth et al. |
| 7,160,615 B2 | 1/2007 | Iwaida et al. |
| 7,169,284 B1 | 1/2007 | Jiang et al. |
| 7,171,267 B2 | 1/2007 | Harguth et al. |
| 7,177,140 B2 | 2/2007 | Clarke et al. |
| 7,203,055 B2 | 4/2007 | Shin et al. |
| 7,224,576 B2 | 5/2007 | Hossick-Schott |
| 7,242,572 B2 | 7/2007 | Norton et al. |
| 7,244,279 B2 | 7/2007 | Seitz et al. |
| 7,256,982 B2 | 8/2007 | Lessner et al. |
| 7,271,994 B2 | 9/2007 | Stemen et al. |
| 7,279,117 B2 | 10/2007 | Komatsu et al. |
| 7,324,329 B2 | 1/2008 | Dweik et al. |
| 7,342,774 B2 | 3/2008 | Hossick-Schott et al. |
| 7,342,775 B2 | 3/2008 | Hahn et al. |
| 7,347,954 B2 | 3/2008 | Banno et al. |
| 7,368,202 B2 | 5/2008 | Kurihara et al. |
| 7,377,948 B2 | 5/2008 | Faris |
| 7,410,509 B2 | 8/2008 | Eberhard et al. |
| 7,460,356 B2 | 12/2008 | Ning |
| 7,474,521 B2 | 1/2009 | Hossick-Schott |
| 7,480,130 B2 | 1/2009 | Fife et al. |
| 7,483,260 B2 | 1/2009 | Ziarniak et al. |
| 7,499,260 B2 | 3/2009 | Schott et al. |
| 7,511,943 B2 | 3/2009 | Fife et al. |
| 7,875,732 B2 * | 1/2011 | Nishida et al. ................ 548/574 |
| 2004/0225327 A1 | 11/2004 | Norton et al. |
| 2004/0240152 A1 | 12/2004 | Schott et al. |
| 2004/0243183 A1 | 12/2004 | Norton et al. |
| 2005/0002147 A1 | 1/2005 | Nielsen et al. |
| 2005/0089711 A1 | 4/2005 | Hossick-Schott |
| 2005/0098242 A1 | 5/2005 | Hossick-Schott et al. |
| 2005/0177193 A1 | 8/2005 | Nielsen et al. |
| 2006/0028786 A1 | 2/2006 | Norton et al. |
| 2006/0028787 A1 | 2/2006 | Yoshida et al. |
| 2006/0091020 A1 | 5/2006 | Hossick-Schott et al. |
| 2006/0123609 A1 | 6/2006 | Norton et al. |
| 2006/0139850 A1 | 6/2006 | Rorvick et al. |
| 2006/0156920 A1 | 7/2006 | Ekiner et al. |
| 2006/0187616 A1 | 8/2006 | Norton et al. |
| 2007/0274025 A1 | 11/2007 | Lessner et al. |

| | | | |
|---|---|---|---|
| 2008/0068779 | A1 | 3/2008 | Restorff et al. |
| 2008/0089012 | A1 | 4/2008 | Kon et al. |
| 2008/0119897 | A1 | 5/2008 | Norton et al. |
| 2008/0131783 | A1 | 6/2008 | Choi et al. |
| 2008/0229565 | A1 | 9/2008 | Schott et al. |
| 2008/0232030 | A1 | 9/2008 | Jones et al. |
| 2008/0232031 | A1 | 9/2008 | Ning |
| 2008/0232032 | A1 | 9/2008 | Jones et al. |
| 2008/0304207 | A1 | 12/2008 | Brandon et al. |

FOREIGN PATENT DOCUMENTS

| | | | |
|---|---|---|---|
| EP | 0989572 A3 | | 3/2000 |
| EP | 1244168 A1 | | 9/2002 |
| GB | 1071217 | | 6/1967 |
| GB | 2 447 724 | * | 9/2008 |
| GB | 2447724 A | | 9/2008 |
| WO | WO 9952954 A1 | | 10/1999 |
| WO | WO 0157928 A1 | | 8/2001 |
| WO | WO 2004027789 A1 | | 4/2004 |
| WO | WO 2006127663 A2 | | 11/2006 |
| WO | WO 2006127663 A3 | | 11/2006 |

OTHER PUBLICATIONS

Abstract of Japanese Patent No. JP2023604, Jan. 25, 1990.
Abstract of Japanese Patent No. JP2005222851, Aug. 18, 2005.
Abstract of Japanese Patent No. JP2005223155, Aug. 18, 2005.
*Adsorption of Gases in Multimolecular Layers*, Brunauer et al., The Journal of the American Chemical Society, vol. 60, Feb. 1938, pp. 309-319.
*Characterization of Plasticized PEO Based Solid Polymer Electrolyte by XRD and AC Impedance Methods*, Ragavendran et al., Portugaliae Electrochimica Acta 22 (2004), pp. 149-159.
*Improved Capacitor Using Amorphous $RuO_2$*, Evans et al., $9^{th}$ Int'l Seminar on Double Layer Capacitors and Similar Energy Storage Devices, Dec. 6-8, 1999, Deerfield Beach, FL.
*New Acidic Polymer Hydrogel Electrolyte for Use in Electric Double Layer Capacitors*, Nohara et al., $214^{th}$ Meeting of the Electrochemical Society, Oct. 12-17, 2008, 1 page.
Related U.S. Patent Application Form.
Search Report for GB1000236.8 dated Apr. 13, 2010, 3 pages.

* cited by examiner

ELECTROLYTIC CAPACITOR CONTAINING A LIQUID ELECTROLYTE

BACKGROUND OF THE INVENTION

Electrolytic capacitors are increasingly being used in the design of circuits due to their volumetric efficiency, reliability, and process compatibility. Electrolytic capacitors typically have a larger capacitance per unit volume than certain other types of capacitors, making them valuable in relatively high-current and low-frequency electrical circuits. One type of capacitor that has been developed is a wet electrolytic capacitor that includes an anode, a cathode current collector (e.g., aluminum can), and a liquid electrolyte. Liquid electrolytes are advantageous due to the potential to reach high ionic conductivity. However, such an electrolyte has its drawbacks as well. For example, a separator material (e.g., fabric or paper) is often required not only to retain the liquid electrolyte between the anode and cathode, but also to maintain a constant distance between the electrodes. This is particular important for high voltage and high reliability capacitors. Unfortunately, although the liquid electrolyte itself has a comparatively high ionic conductivity, the combination of the liquid electrolyte and separator material has a higher electrical resistance. The addition of a separator may also decrease the energy density of the capacitor. Furthermore, the liquid electrolyte is often apt to leak from the capacitor, which can lead to various problems, including a difficulty in mounting to electrical devices.

As such, a need currently exists for an improved electrolytic capacitor that contains a liquid electrolyte.

SUMMARY OF THE INVENTION

In accordance with one embodiment of the present invention, an electrolytic capacitor is disclosed that comprises an anode comprising an anodically oxidized porous body; a cathode comprising a metal substrate; and a liquid electrolyte disposed between the cathode and the anode. The electrolyte comprises an alkali metal salt, an ionically conductive polymer, and an organic solvent. The liquid electrolyte has a viscosity of from about 10 to about 400 Poise, as determined at a temperature of 25° C. and shear rate of 1 $\sec^{-1}$.

In accordance with another embodiment of the present invention, an electrolytic capacitor is disclosed that comprises an anode, cathode, and a liquid electrolyte disposed between the cathode and the anode. The anode comprises an anodically oxidized porous body, the porous body containing tantalum, niobium, or an electrically conductive oxide thereof. The cathode comprises a metal substrate. Further, the electrolyte comprises a lithium salt, an ionically conductive polymer, and an organic solvent, wherein organic solvents constitute from about 50 wt. % to about 99 wt. % of the electrolyte.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Repeat use of reference characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed an electrolytic capacitor that contains an anodically oxidized porous anode, cathode, and an electrolyte that contains an alkali metal salt and ionically conductive polymer. The alkali metal salt forms a complex with the ionically conductive polymer and thereby improves its ionic conductivity, particularly at higher temperatures. The electrolyte also contains an organic solvent that reduces the viscosity of the electrolyte and helps lower the potential barrier to metal ion transport within the electrolyte to improve conductivity. By selectively controlling the relative amount of each of these components, the present inventors have discovered that a highly ionically conductive electrolyte may be formed that is also in the form of a viscous liquid. The liquid nature of the electrolyte enables it to more readily enter the pores of the anode via capillary forces and improve specific capacitance. Further, although a liquid, its viscous nature may inhibit the likelihood of leakage.

In this regard, the organic solvent(s) typically constitute from about 50 wt. % to about 99 wt. %, in some embodiments from about 70 wt. % to about 95 wt. %, and in some embodiments, from about 80 wt. % to about 90 wt. % of the electrolyte. The ionically conductive polymer(s) may likewise constitute from about 0.1 wt. % to about 20 wt. %, in some embodiments from about 0.5 wt. % to about 15 wt. %, and in some embodiments, from about 1 wt. % to about 10 wt. % of the electrolyte. Further, the alkali metal salt(s) may constitute from about 0.5 wt. % to about 25 wt. %, in some embodiments from about 1 wt. % to about 20 wt. %, and in some embodiments, from about 4 wt. % to about 15 wt. % of the electrolyte. When employing the organic solvent, ionically conductive polymer, and alkali metal salt in such amounts, the resulting electrolyte is a liquid and has a viscosity that typically ranges from about 10 to about 400 Poise, in some embodiments from about 20 to about 300 Poise, and in some embodiments, from about 30 to about 200 poise, as determined at a temperature of 25° C. and a shear rate of 1 sec$^{-1}$ using known techniques, such as with a Brookfield DV-1 viscometer with an LV-4 spindle. The electrical conductivity of the electrolyte is also about 10 milliSiemens per centimeter ("mS/cm") or more, in some embodiments about 30 mS/cm or more, and in some embodiments, from about 40 mS/cm to about 100 mS/cm, determined at a temperature of 25° C. and using any known electric conductivity meter (e.g., Oakton Con Series 11).

Various embodiments of the electrolytic capacitor of the present invention will now be described in more detail.

I. Electrolyte

Any of a variety of alkali metal salts may be employed in the electrolyte that provide the desired level of conductivity. For example, the alkali metal salt may contain any Group I metal, such as Li, Na, K, Rb, Cs, or Fr, and an anion, such as Cl$^-$, Br$^-$, I$^-$, SCN$^-$, ClO$_4^-$, BF$_4^-$, PF$_6^-$, CF$_3$SO$_3^-$, (CF$_3$SO$_2$)$_2$N$^-$, etc. Particularly suitable salts are lithium salts, such as LiBr, LiI, LiSCN, LiClO$_4$, LiBF$_4$, LiAsF$_6$, LiPF$_6$, LiCF$_3$SO$_3$, LiAlCl$_4$, LiC(CF$_3$SO$_2$)$_3$, LiPF$_3$(CF$_3$)$_3$, LiPF$_3$(C$_2$F$_5$)$_3$, LiBF$_4$, LiBF$_3$CF$_3$, LiBF$_3$(C$_2$F$_5$), LiBF$_3$(C$_3$F$_7$), LiN(CF$_3$SO$_2$)$_2$, LiN(C$_2$F$_5$SO$_2$)$_2$, LiN(CF$_3$SO$_2$)(C$_4$F$_9$SO$_2$), bis[trifluoromethanesulfonyl]imidolithium (LiTFSI), etc., as well as mixtures thereof. Still other suitable alkali metal salts may include NaBr, NaSCN, NaClO$_4$, KSCN, KClO$_4$, etc., as well as mixtures thereof.

The ionically conductive polymer typically includes one or more monomers that contain a hetero atom with a lone pair of electrons available for the metal ions of the alkali metal salt to coordinate to and move between. Examples of such polymers include, for instance, polyethylene oxide (PEO); poly(bis(methoxy-ethoxy-ethoxide))-phosphazene (MEEP); a triol-type PEO crosslinked with difunctional urethane, poly((oligo)oxyethylene)methacrylate-co-alkali metal methacrylate; polyacrylonitrile (PAN), polymethylmethacrylate (PMMA), polymethylacrylonitrile (PMAN); polysiloxanes and their copolymers and derivatives, polyvinylidene fluoride or chloride and copolymers of their derivatives, poly(chlorotrifluoro-ethylene), poly(ethylene-chlorotrifluoroethylene), poly(fluorinated ethylene-propylene), acrylate-based polymer, etc., as well as combinations of the foregoing polymers either condensed or crosslinked to form a different polymer, and mixtures of any of the foregoing polymers.

Any of a variety of organic solvents may be employed in the electrolyte, such as ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, methoxypropyl acetate, ethylene carbonate, propylene carbonate, etc.); amides (e.g., dimethylformamide, dimethylacetamide, dimethylcaprylic/capric fatty acid amide and N-alkylpyrrolidones); lactones (e.g., γ-butyrolactone); nitriles (e.g., acetonitrile, propionitrile, butyronitrile and benzonitrile); sulfoxides or sulfones (e.g., dimethyl sulfoxide (DMSO) and sulfolane); and so forth. In one particular embodiment, a cyclic carbonic acid ester is employed as a solvent, including saturated cyclic carbonic acid esters, such as ethylene carbonate, propylene carbonate, butylene carbonate, etc.; unsaturated cyclic carbonic acid esters, such as vinylene carbonate, 4,5-dimethyl vinylene carbonate, 4,5-diethyl vinylene carbonate, 4,5-dipropyl vinylene carbonate, 4-ethyl-5-methyl vinylene carbonate, 4-ethyl-5-propyl vinylene carbonate, 4-methyl-5-propyl vinylene carbonate, etc; and mixtures and/or derivatives of any of the foregoing.

Although not required, the electrolyte may also contain other components that help improve the electrical performance of the capacitor. In certain embodiments, for example, an additional polymer may be employed to help achieve the desired viscosity. It is desired that such additional polymers are chemically stable and generally compatible with the organic solvent. Such polymers also typically have a relatively high glass transition temperature, such as about 0° C. or more, in some embodiments from about 10° C. to about 80° C., and in some embodiments, from about 20° C. to about 60° C. Examples of suitable polymers may include, for instance, polyamides, polycarbonates, polyvinyl alcohols, polyurethanes, etc. Particular examples of polycarbonates include, for instance, polyethylene carbonate, polypropylene carbonate, polybutadiene carbonate or polyvinylidene carbonate, etc., as well as mixtures and/or derivatives thereof. When employed, such additional polymer(s) may constitute from about 0.1 wt. % to about 20 wt. %, in some embodiments from about 0.5 wt. % to about 15 wt. %, and in some embodiments, from about 1 wt. % to about 10 wt. % of the electrolyte.

If desired, other components may also be employed in the electrolyte. For instance, to ensure that the electrolyte remains stable during conditions of normal storage and use, it is generally desired that its freezing point is about −20° C. or less, and in some embodiments, about −25° C. or less. If desired, one or more freezing point depressants may be employed, such as glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); and so forth. It should also be noted that the boiling point of the electrolyte is typically about 85° C. or more, and in some embodiments, about 100° C. or more, so that the electrolyte remains stable at elevated temperatures.

A depolarizer may also be employed in the electrolyte to help inhibit the evolution of hydrogen gas at the cathode of the electrolytic capacitor, which could otherwise cause the capacitor to bulge and eventually fail. When employed, the depolarizer normally constitutes from about 1 to about 500 parts per million ("ppm"), in some embodiments from about 10 to about 200 ppm, and in some embodiments, from about 20 to about 150 ppm of the electrolyte. Suitable depolarizers may include nitroaromatic compounds, such as 2-nitrophenol, 3-nitrophenol, 4-nitrophenol, 2-nitrobenzonic acid, 3-nitrobenzonic acid, 4-nitrobenzonic acid, 2-nitroacetophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and so forth. Particularly suitable nitroaromatic depolarizers for use in the present invention are nitrobenzoic acids, anhydrides or salts thereof, substituted with one or more alkyl groups (e.g., methyl, ethyl, propyl, butyl, etc). Specific examples of such alkyl-substituted nitrobenzoic compounds include, for instance, 2-methyl-3-nitrobenzoic acid; 2-methyl-6-nitrobenzoic acid; 3-methyl-2-nitrobenzoic acid; 3-methyl-4-nitrobenzoic acid; 3-methyl-6-nitrobenzoic acid; 4-methyl-3-nitrobenzoic acid; anhydrides or salts thereof; and so forth. Without intending to be limited by theory, it is believed that alkyl-substituted nitrobenzoic compounds may be preferentially electrochemically adsorbed on the active sites of the cathode surface when the cathode potential reaches a low region or the cell voltage is high, and may be subsequently desorbed therefrom into the electrolyte when the cathode potential goes up or the cell voltage is low. In this manner, the compounds are "electrochemically reversible", which may provide improved inhibition of hydrogen gas production.

II. Anode

The anode of the electrolytic capacitor includes a porous body that may be formed from a valve metal composition having a high specific charge, such as about 5,000 µF*V/g or more, in some embodiments about 25,000 µF*V/g or more, in some embodiments about 50,000 µF*V/g or more, and in some embodiments, from about 70,000 to about 300,000 µF*V/g. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

Conventional fabricating procedures may generally be utilized to form the porous anode body. In one embodiment, a tantalum or niobium oxide powder having a certain particle size is first selected. The particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2/g$, in some embodiments from about 0.5 to about 5.0 $m^2/g$, and in some embodiments, from about 1.0 to about 2.0 $m^2/g$. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 $g/cm^3$, in some embodiments from about 0.2 to about 4.0 $g/cm^3$, and in some embodiments, from about 0.5 to about 3.0 $g/cm^3$.

To facilitate the construction of the anode body, other components may be added to the electrically conductive particles. For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), polyvinyl alcohols, naphthalene, vegetable wax, and microwaxes (purified paraffins). The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. If desired, any binder/lubricant may be removed after compression, such as by heating the formed pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes.

The thickness of the pressed anode body may be relatively thin, such as about 4 millimeters or less, in some embodiments, from about 0.05 to about 2 millimeters, and in some embodiments, from about 0.1 to about 1 millimeter. The shape of the anode body may also be selected to improve the electrical properties of the resulting capacitor. For example, the anode body may have a shape that is curved, sinusoidal, rectangular, U-shaped, V-shaped, etc. The anode body may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes.

Once formed, the anode body may be anodized so that a dielectric layer is formed over and/or within the anode. Anodization is an electrochemical process by which the anode is oxidized to form a material having a relatively high dielectric constant. For example, a tantalum (Ta) anode may be anodized to tantalum pentoxide ($Ta_2O_5$). Typically, anodization is performed by initially applying a solution to the anode, such as by dipping anode into the electrolyte. A solvent is generally employed, such as water (e.g., deionized water). To enhance ionic conductivity, a compound may be employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired ionic conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of ionic compounds may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage typically ranges from about 4 to about 200 V, and in some embodiments, from about 9 to about 100 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

III. Cathode

The cathode may be constructed using any of a variety of techniques. In one embodiment, the cathode contains a metal substrate that may include any metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. Titanium metals, as well as alloys thereof, are particularly suitable for use in the present invention. The geometric configuration of the substrate may generally vary as is well known to those skilled in the art, such as in the form of a container, can, foil, sheet, screen, mesh, etc. The surface area of the substrate may range from about 0.05 to about 5 square centimeters, in some embodiments from about 0.1 to about 3 square centimeters, and in some embodiments, from about 0.5 to about 2 square centimeters.

If desired, an electrochemically-active material may optionally be applied to the metal substrate to inhibit corrosion of the substrate and also act as a heat barrier when voltage is increased. Any of a variety of known electrochemically-active materials may generally be employed. In one embodiment, for example, a conductive polymer may be employed, such as a polypyrrole; polythiophene, such as poly(3,4-ethylenedioxythiophene) (PEDT); polyaniline; polyacetylene; poly-p-phenylene; derivatives thereof; and so forth. As is known in the art, such conductive polymers may be formed from a monomer that polymerizes to assume an amorphous, non-crystalline form, which appears somewhat like a web or film when viewed under scanning electron microscopy. This means that the resultant conductive polymer coating may form a substantially uniform coating that is protective, yet electrochemically active.

The conductive polymer coating may contain one or multiple conductive polymer layers and be formed using a variety of known techniques. For instance, techniques such as screen-printing, dipping, electrophoretic coating, and spraying, may be used to form the coating. In one embodiment, for example, the monomer(s) used to form the conductive polymer (e.g., PEDT), may initially be mixed with a polymerization catalyst to form a dispersion. One suitable polymerization catalyst is CLEVIOS C (Bayer Corporation), which is iron (III) toluenesulphonate and n-butanol. CLEVIOS C is a commercially available catalyst for CLEVIOS M, which is 3,4-ethylenedioxythiophene, a PEDT monomer also sold by Bayer Corporation. Once a dispersion is formed, the substrate may then be dipped into the dispersion so that the conductive polymer forms. Alternatively, the catalyst and monomer(s) may also be applied separately. For example, the catalyst may be dissolved in a solvent (e.g., butanol) and then applied as a dipping solution. Although various methods have been described above, it should be understood that any other method for applying the coating comprising the conductive polymer coating may also be utilized. For example, other methods for applying such a coating comprising one or more conductive polymers may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes.

In addition to or in lieu of conductive polymers, metals, such as metal particles formed from ruthenium, iridium, nickel, rhodium, rhenium, cobalt, tungsten, manganese, tantalum, niobium, molybdenum, lead, titanium, platinum, palladium, and osmium, as well as combinations of these metals, may also be employed. In one particular embodiment, for example, the electrochemically-active material includes palladium particles. Non-insulating oxide particles may also be employed in the present invention. Suitable oxides may include a metal selected from the group consisting of ruthenium, iridium, nickel, rhodium, rhenium, cobalt, tungsten, manganese, tantalum, niobium, molybdenum, lead, titanium, aluminum, platinum, palladium, and osmium, as well as combinations of these metals. Particularly suitable metal oxides include ruthenium dioxide, niobium oxide, niobium dioxide, iridium oxide, and manganese dioxide. Carbonaceous particles may also be employed that have the desired level of conductivity, such as activated carbon, carbon black, graphite, etc. Some suitable forms of activated carbon and techniques for formation thereof are described in U.S. Pat. No. 5,726,118 to Ivey, et al.; U.S. Pat. No. 5,858,911 to Wellen, et al.; as well as U.S. Patent Application Publication No. 2003/0158342 to Shinozaki, et al., all of which are incorporated herein in their entirety by reference thereto for all purposes.

If desired, a binder may sometimes be employed to help promote adhesion of the electrochemically-active material to the substrate. Any binder that provides the requisite level of adhesive strength may be used. For example, suitable binders may include polytetrafluoroethylene, polyvinylidene fluoride, carboxymethylcellulose, fluoro-olefin copolymer crosslinked polymer, polyvinyl alcohol, polyacrylic acid, polyimide, petroleum pitch, coal pitch, and phenol resins. An electrically conductive filler may also be employed in some embodiments to further enhance the conductivity of the electrochemically-active material. Such conductive fillers may be particularly beneficial in counteracting any loss of conductivity that might result from a binder covering a portion of the surface of the electrochemically-active material. Any suitable conductive filler may be employed, such as metallic particles (e.g., silver, copper nickel, aluminum, and so forth); non-metallic particles (e.g., carbon black, graphite, and so forth).

Figure 1:
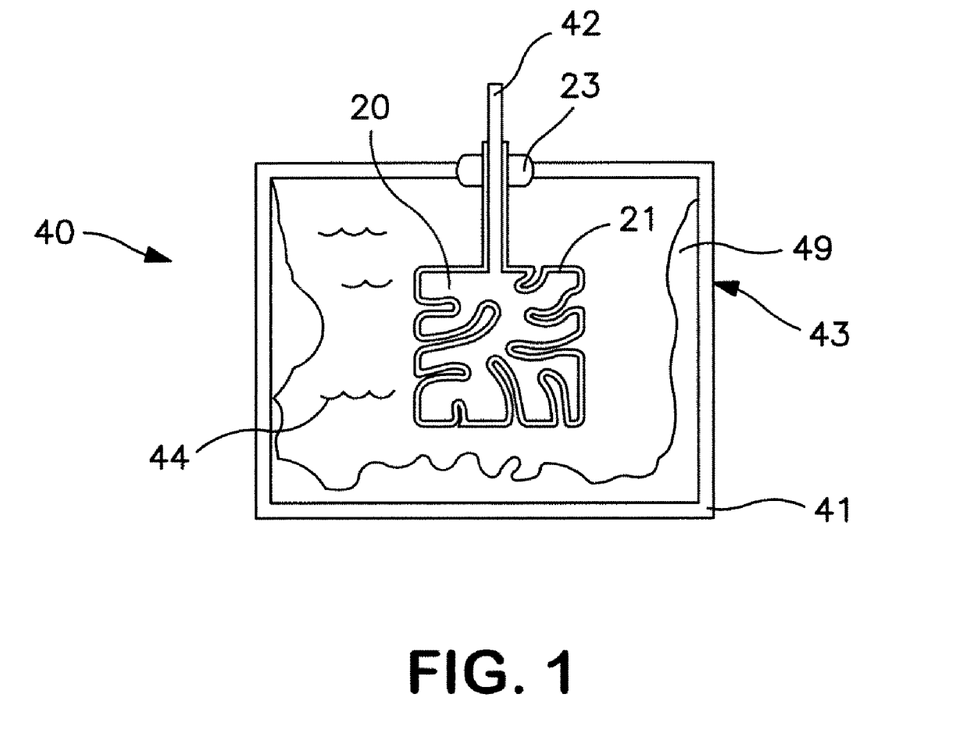
FIG. 1 is a cross-sectional view of one embodiment of a capacitor formed according to the present invention.

The physical arrangement of the anode, cathode, and electrolyte of the capacitor may generally vary as is well known in the art. Referring to FIG. 1, for example, one embodiment of an electrolytic capacitor 40 is shown that includes a liquid electrolyte 44 disposed between an anode 20 and a cathode 43. The anode 20 contains a dielectric film 21 and is embedded with a lead 42 (e.g., tantalum wire). The cathode 43 is formed from a substrate 41, such as described above, and an electrochemically-active material 49 (e.g., conductive polymer). In this embodiment, the cathode substrate 41 is in the form of a cylindrically-shaped "can" with an attached lid. A seal 23 (e.g., glass-to-metal) may also be employed that connects and seals the anode 20 to the cathode 43. If desired, a separator (e.g., paper, plastic fibers, glass fibers, porous membranes, and ion-permeable materials, such as Nafion™) may also be positioned between the cathode 43 and anode 20 to prevent direct contact between the anode and cathode, yet permit ionic current flow of the electrolyte 44 to the electrodes. However, one benefit of the present invention, as mentioned above, is that such separators are not required due to the relatively viscous nature of the liquid electrolyte. In fact, it may be desirable in certain embodiments that the capacitor is free from such a separator.

The electrolytic capacitor of the present invention may be used in various applications, including but not limited to medical devices, such as implantable defibrillators, pacemakers, cardioverters, neural stimulators, drug administering devices, etc.; automotive applications; military applications, such as RADAR systems; consumer electronics, such as radios, televisions, etc.; and so forth. In one embodiment, for example, the capacitor may be employed in an implantable medical device configured to provide a therapeutic high voltage (e.g., between approximately 500 Volts and approximately 850 Volts, or, desirably, between approximately 600 Volts and approximately 900 Volts) treatment for a patient. The device may contain a container or housing that is hermetically sealed and biologically inert. One or more leads are electrically coupled between the device and the patient's heart via a vein. Cardiac electrodes are provided to sense cardiac activity and/or provide a voltage to the heart. At least a portion of the leads (e.g., an end portion of the leads) may be provided adjacent or in contact with one or more of a ventricle and an atrium of the heart. The device also contains a capacitor bank that typically contains two or more capacitors connected in series and coupled to a battery that is internal or external to the device and supplies energy to the capacitor bank. Due in part to high conductivity, the capacitor of the present invention can achieve excellent electrical properties and thus be suitable for use in the capacitor bank of the implantable medical device.

The present invention may be better understood by reference to the following examples.

Example 1

Figure 2:
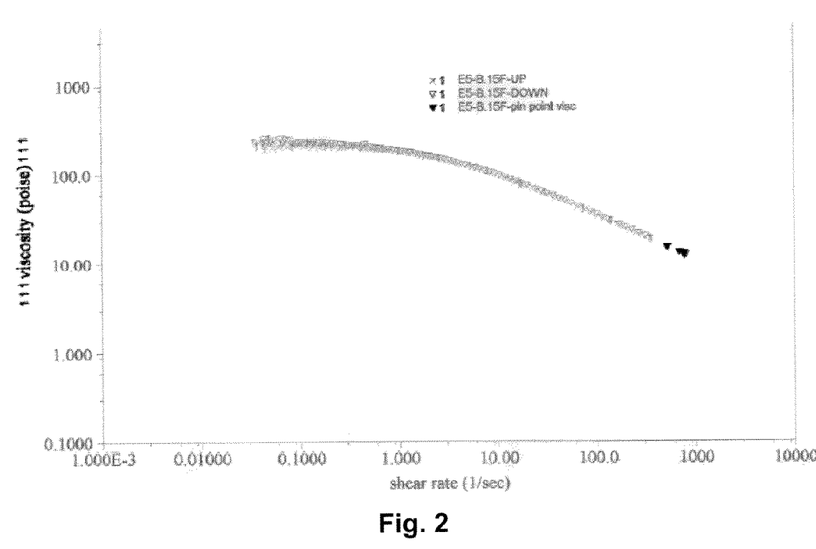
FIGS. 2-4 are graphical representations of the viscosity of the electrolytes formed in Examples 1-3 at various shear rates.

An electrolyte was formed by dissolving 3.18 grams of $LiClO_4$ (Sigma Aldrich) in 10 milliliters of dry propylene carbonate (Sigma Aldrich). Separately, 1 gram of poly(propylene carbonate) (Sigma-Aldrich) and 2 grams of poly(ethylene oxide) (Sigma-Aldrich) were each dissolved in 10 milliliters of propylene carbonate. The poly(propylene carbonate) was then mixed with the poly(ethylene oxide) solution, which resulted in a viscous clear solution that did not exhibit phase separation. The $LiClO_4$ solution was thereafter added to the polymer mixture to form a clear electrolyte, which was then cooled to room temperature. The viscosity of the resulting electrolyte was recorded by placing 1 ml onto a 4-cm plate in a plate-plate (Model AR1000 Thermal Analysis and Rheology) rheometer. The results are shown in FIG. 2. At 1 sec$^{-1}$, the viscosity was 34 poise (at 25° C.).

Example 2

Figure 3:
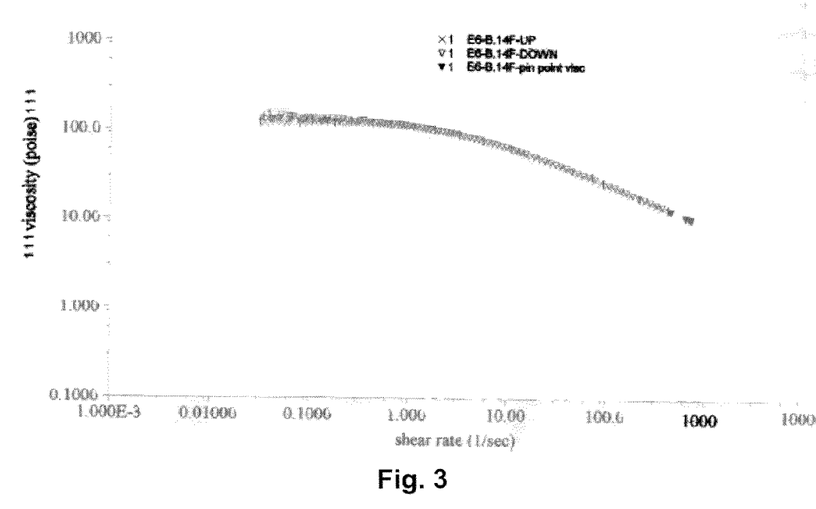

An electrolyte was formed as described in Example 1, except that 1.5 grams of poly(propylene carbonate) and 1.5 grams of poly(ethylene oxide) were employed. The viscosity of the resulting electrolyte was recorded by placing 1 ml onto a 4-cm plate in a plate-plate (Model AR1000 Thermal Analysis and Rheology) rheometer. The results are shown in FIG. 3. At 1 sec$^{-1}$, the viscosity was 120 poise (at 25° C.).

Example 3

Figure 4:
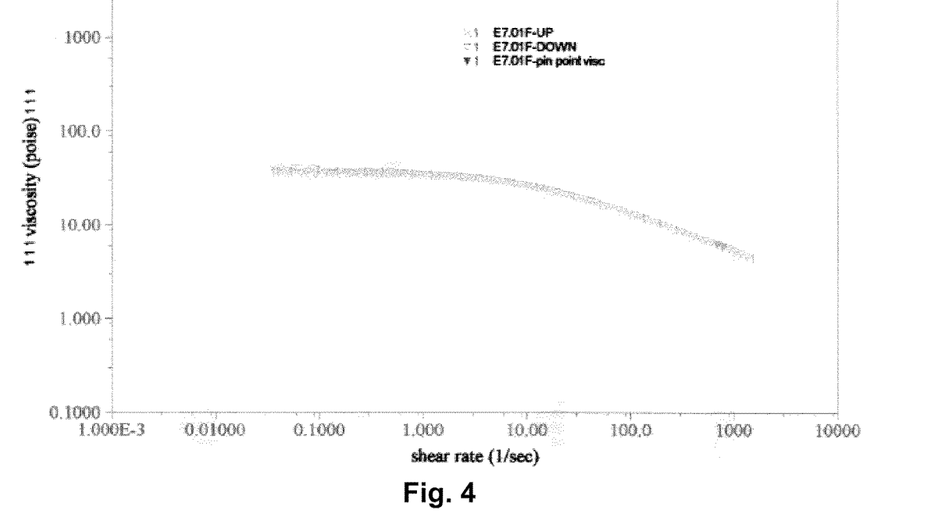

An electrolyte was formed as described in Example 1, except that 2 grams of poly(propylene carbonate) and 1 gram of poly(ethylene oxide) were employed. The viscosity of the resulting electrolyte was recorded by placing 1 ml onto a 4-cm plate in a plate-plate (Model AR1000 Thermal Analysis and Rheology) rheometer. The results are shown in FIG. 4. At 1 sec$^{-1}$, the viscosity was 181 poise (at 25° C.).

Example 4

An electrolyte was initially formed by dissolving 5 grams of $LiClO_4$ (Sigma Aldrich) in 50 milliliters of dry propylene carbonate (Sigma Aldrich). A cathode substrate was formed by degreasing a titanium plate and etching it with oxalic acid (10 wt. % aqueous solution), drying the plate, and roughening its surface with sandpaper. The resulting substrate was then immersed into the electrolyte. To test the electrolyte, a porous $Ta/Ta_2O_5$ cylindrical body was used as the anode. A low voltage (1-2V) was then applied for 5 minutes to allow the migration of the anions into the porous cylindrical body. The cell was then charged to 100V followed by discharges through a 10 kΩ or 50Ω resistor. The capacitance was measured and also calculated using the formula $V(t)=V_0 * e^{(-t/RC)}$. The measured and calculated capacitance was 151 µF and 270 µF, respectively. Alternatively, the capacitance could also be calculated from the discharge time and the value of discharge resistor using the formula: $C=t(s)/R(\Omega)$.

Example 5

A capacitor was formed as described in Example 4, except that 10 grams of $LiClO_4$ (Sigma Aldrich) was employed. The measured and calculated capacitance was 216 µF and 280 µF, respectively.

Example 6

Figure 5:
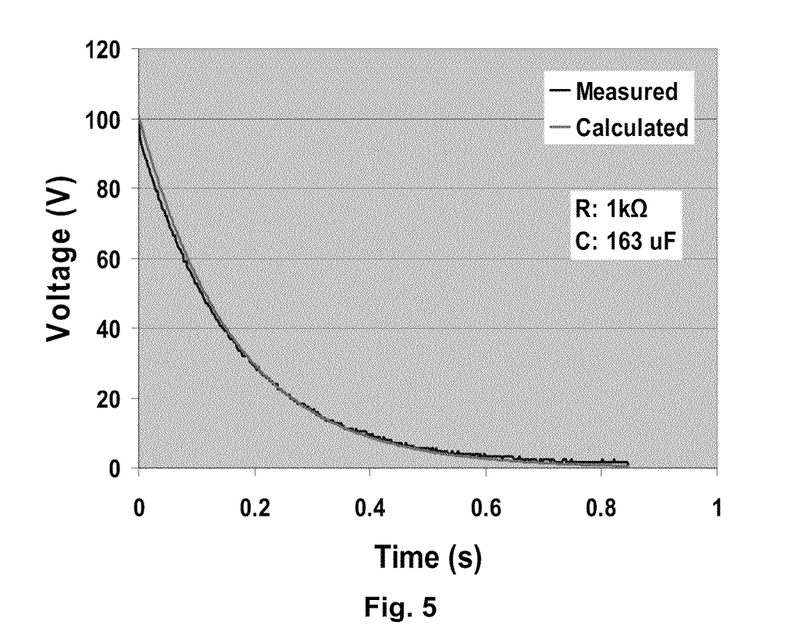
FIG. 5 is the discharge curve of the capacitor test cell through 1 kΩ as described in Example 6.
Figure 6:
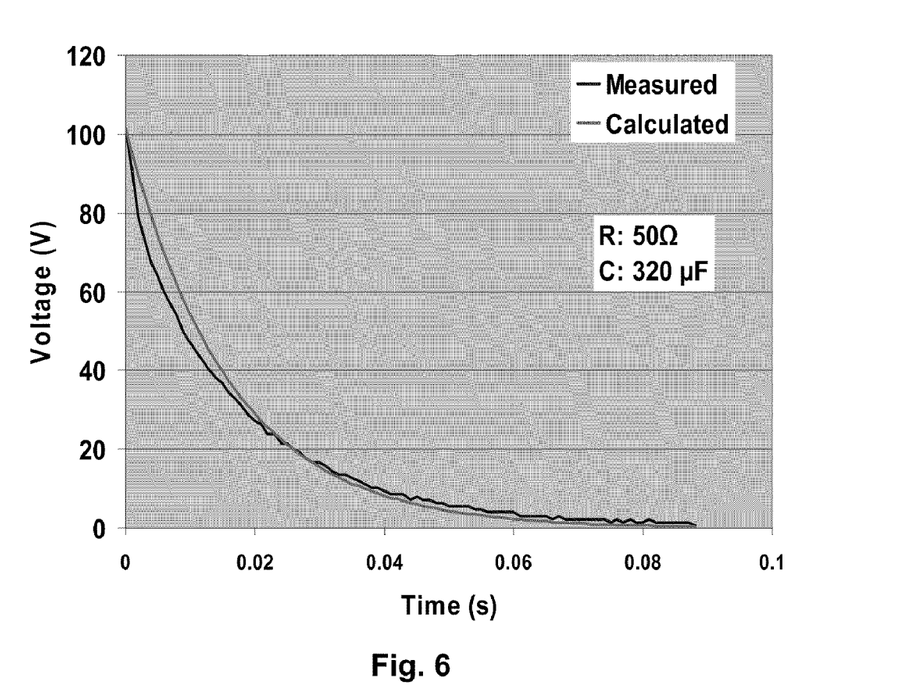
FIG. 6 is the discharge curve of the capacitor test cell through 50Ω as described in Example 6.

A capacitor was formed in the manner described above in Example 1, except that cathode was formed by degreasing a titanium plate, followed by etching the plate in oxalic acid (10 wt % aqueous solution), drying the plate, roughening the plate with sandpaper and applying a PEDT conductive polymer coating. The measured and calculated capacitance was 163 µF and 298 µF, respectively. The results are shown in FIGS. 5 and 6.

Example 7

An electrolyte was initially formed by dissolving 5 grams of $LiClO_4$ (Sigma Aldrich) in 10 milliliters of dry propylene carbonate (Sigma Aldrich). Separately, 2.5 grams of poly(propylene carbonate) (Sigma-Aldrich) and 2.5 grams of poly(ethylene oxide) (Sigma-Aldrich) were each dissolved in 20 milliliters of propylene carbonate. The poly(propylene carbonate) was then mixed with the poly(ethylene oxide) solution, which resulted in a viscous clear solution that did not exhibit phase separation. The $LiClO_4$ solution was thereafter added to the polymer mixture to form a clear electrolyte, which was then cooled to room temperature. A cathode substrate was formed by degreasing a titanium plate and etching it with oxalic acid (10 wt. % aqueous solution), drying the plate, and roughening its surface with sandpaper. The resulting substrate was then immersed into the electrolyte. To test the electrolyte, a porous $Ta/Ta_2O_5$ cylindrical body was used as the anode. A low voltage (1-2V) was then applied for 5 minutes to allow the migration of the anions into the porous cylindrical body. The cell was then charged to 100V followed by discharges through a 10 kΩ resistor. The capacitance was measured and also calculated using the formula $V(t)=V_0 * e^{(-t/RC)}$. The measured and calculated capacitance was 106 µF and 152 µF, respectively.

Example 8

A capacitor was formed as described in Example 7, except that 2.0 grams of poly(propylene carbonate) and 3.0 grams of poly(ethylene oxide) were employed. The measured and calculated capacitance was 106 µF and 152 µF, respectively.

Example 9

A capacitor was formed as described in Example 7, except that 3.0 grams of poly(propylene carbonate) and 2.0 grams of poly(ethylene oxide) were employed. The measured and calculated capacitance was 106 µF and 152 µF, respectively.

Example 10

A capacitor was formed in the manner described in Example 4, except that the cathode was formed by degreasing a titanium plate, followed by etching the plate in oxalic acid (10 wt. % aqueous solution), drying the plate, roughening the plate with sandpaper, and applying a PEDT conductive polymer coating onto it. The measured and calculated capacitance was 176 µF and 320 µF, respectively.

Example 11

A capacitor was formed in the manner described in Example 5, except that the cathode was formed by degreasing a titanium plate, followed by etching the plate in oxalic acid (10 wt. % aqueous solution), drying the plate, roughening the plate with sandpaper, and applying a PEDT conductive polymer coating onto it. The measured and calculated capacitance was 176 µF and 320 µF, respectively.

Example 12

Figure 7:
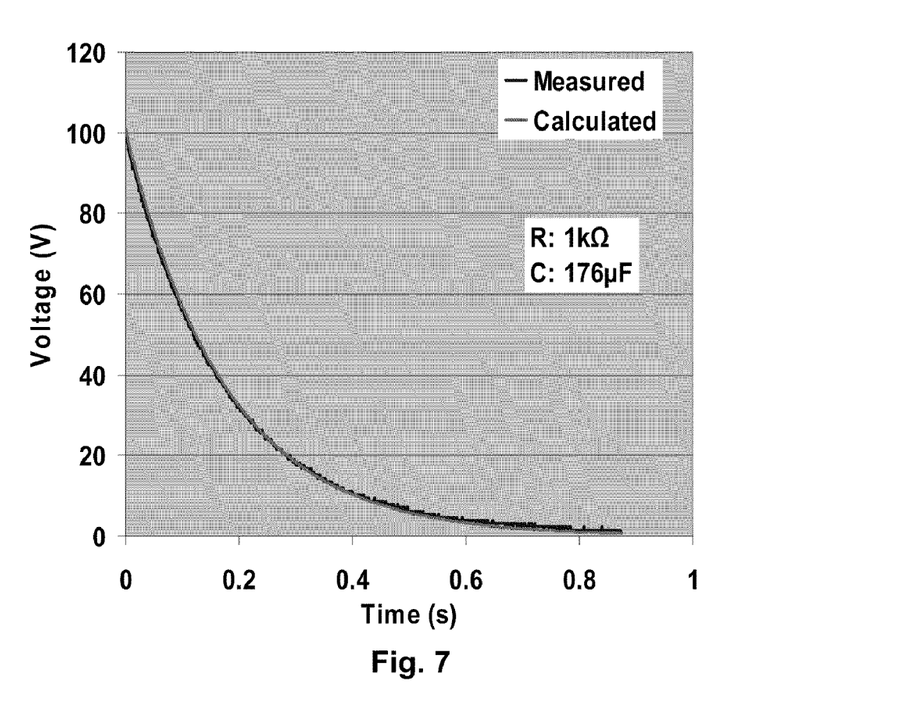
FIG. 7 is the discharge curve of the capacitor test cell through 1 kΩ as described in Example 12.
Figure 8:
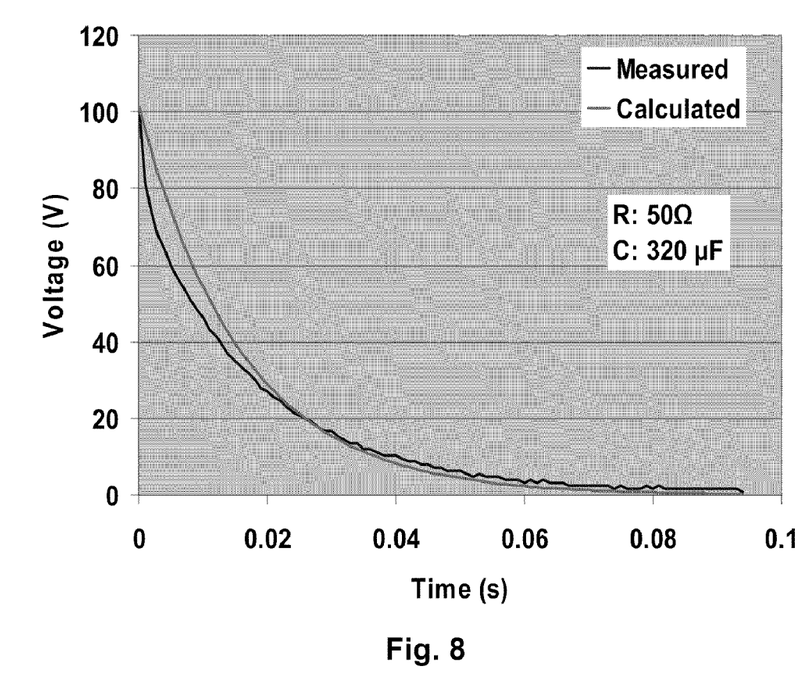
FIG. 8 is the discharge curve of the capacitor test cell through 50Ω as described in Example 12.

A capacitor was formed in the manner described in Example 6, except that the cathode was formed by degreasing a titanium plate, followed by etching the plate in oxalic acid (10 wt. % aqueous solution), drying the plate, roughening the plate with sandpaper, and applying a PEDT conductive polymer coating onto it. The measured and calculated capacitance was 176 µF and 320 µF, respectively. The results are shown in FIGS. 7 and 8.

Example 13

Figure 9:
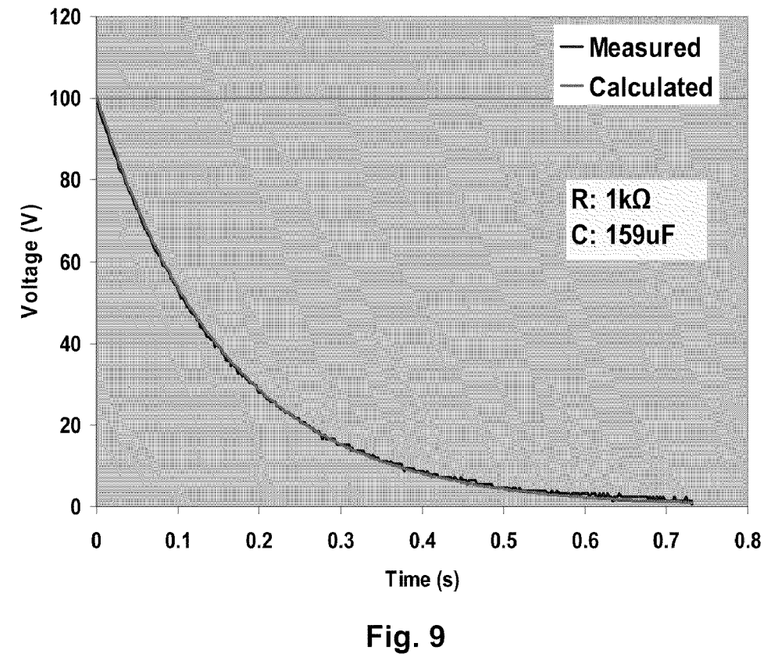
FIG. 9 is the discharge curve of the capacitor test cell through 1 kΩ as described in Example 13.
Figure 10:
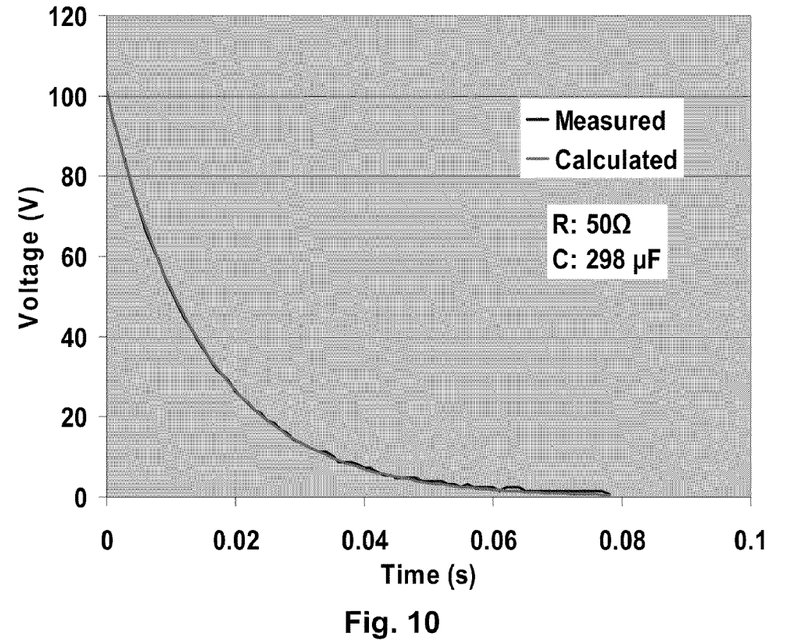
FIG. 10 is the discharge curve of the capacitor test cell through 50Ω as described in Example 13.
Figure 11:
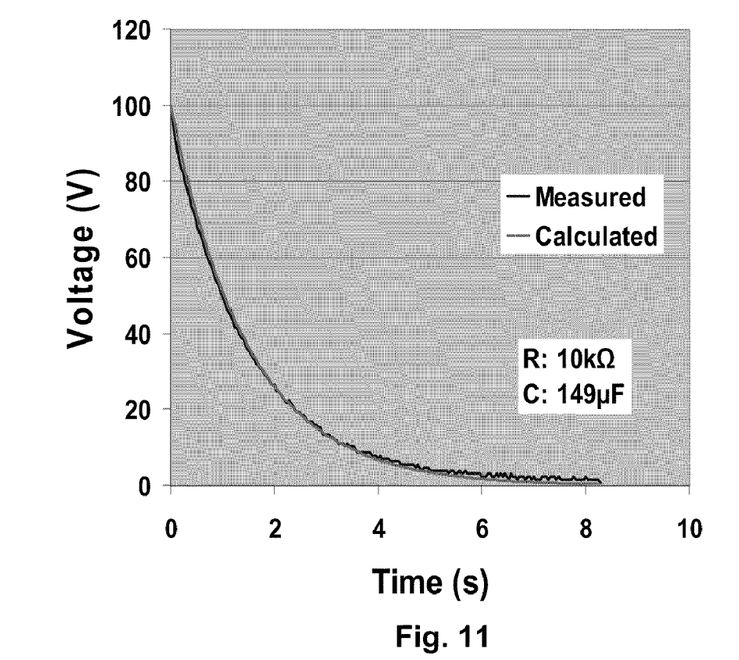
FIG. 11 is the discharge curve of the capacitor test cell through 10 kΩ as described in Example 13.

A liquid electrolyte was prepared by dissolving 213 grams of ammonium adipate (Betapharma) in 536 milliliters of deionized water. Upon dissolution, 10 grams of 4-nitrobenzoic acid (Sigma Aldrich) was added and dissolved. To the solution, 258 grams of ethylene glycol (Sigma Aldrich) and 0.3 grams of 3-Methyl-4-nitro benzoic acid (Sigma Aldrich) were added and mixed until all components were dissolved. 5 grams of adipic acid (Sigma Aldrich) and 5 grams of phosphoric acid (85% solution) (Sigma Aldrich) were added to the solution and mixed until the components completely dissolved. To adjust the pH of the electrolyte to 6.5, 1.5 grams of EDTA (ethylenediaminetetraacetic acid) (Sigma Aldrich) was added. A cathode substrate was formed by degreasing a titanium plate, followed by etching it in oxalic acid (10 wt. % aqueous solution), drying the plate, and roughening its surface with sandpaper. The resulting substrate was then immersed in the above electrolyte. To test the electrolyte, a porous $Ta/Ta_2O_5$ cylindrical body was used as the anode. A low voltage (1-2V) was applied for 5 minutes to allow the electrolyte to fill the porous body of the anode. The distance between the electrodes was measured to be 1 millimeter. The cell was then charged to 100V and discharged through a 10 kΩ resistor, 1 kΩ or 50Ω resistor. The measured and calculated capacitance was 149 µF, 159 µF and 298 µF, respectively. The results are shown in FIG. 9-11.

Example 14

Figure 12:
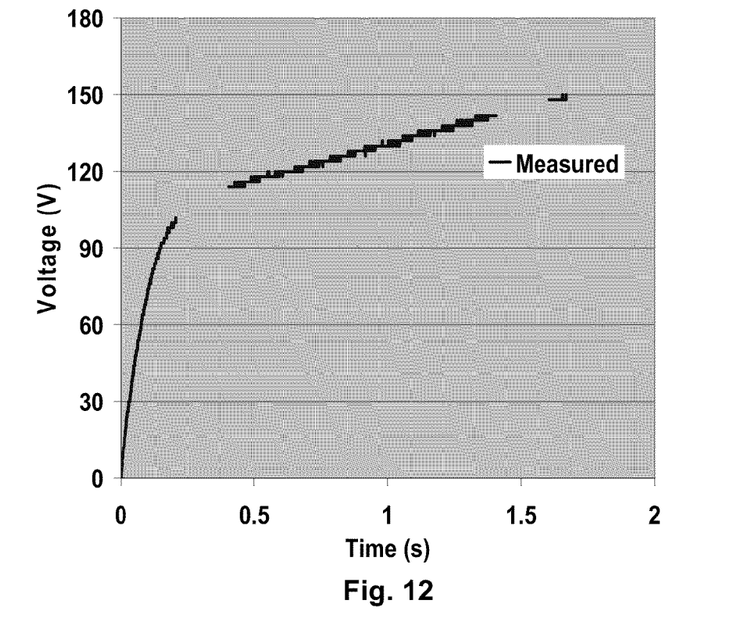
FIG. 12 is the charge curve of the capacitor test cell with a 10 mA charging current obtained using the electrolyte described in Example 14.
Figure 13:
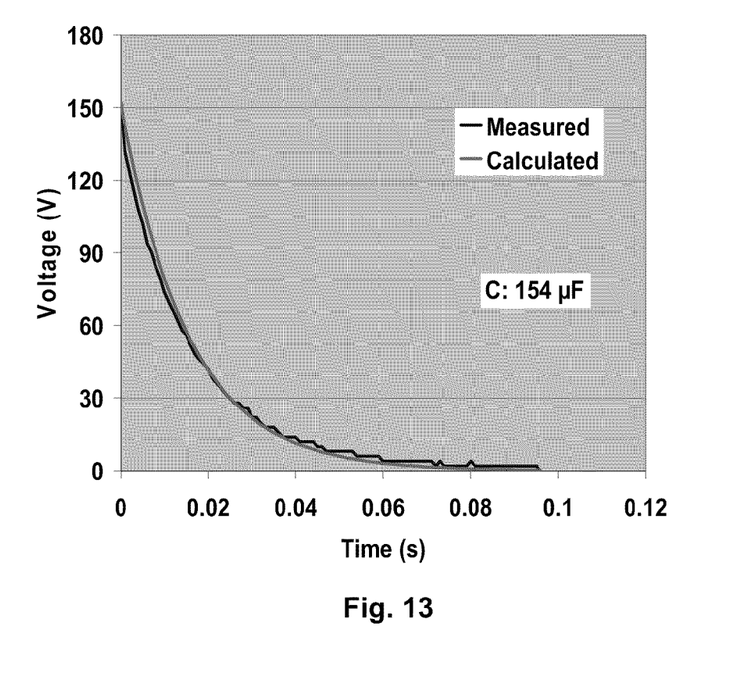
FIG. 13 is the discharge curve of the capacitor test cell through 100Ω as described in Example 14.

A capacitor was formed as described in Example 13, but the cathode substrate was formed by degreasing a titanium plate, followed by etching it in oxalic acid (10 wt. % aqueous solution), drying the plate, and roughening its surface with sandpaper. The resulting substrate was then coated with PEDT. The cell was charged to 150V at 10 mA in less then 1.8 seconds and discharged through a 100Ω resistor. The measured and calculated capacitance was 154 µF. The results are shown in FIGS. 12 and 13.

Example 15

Figure 14:
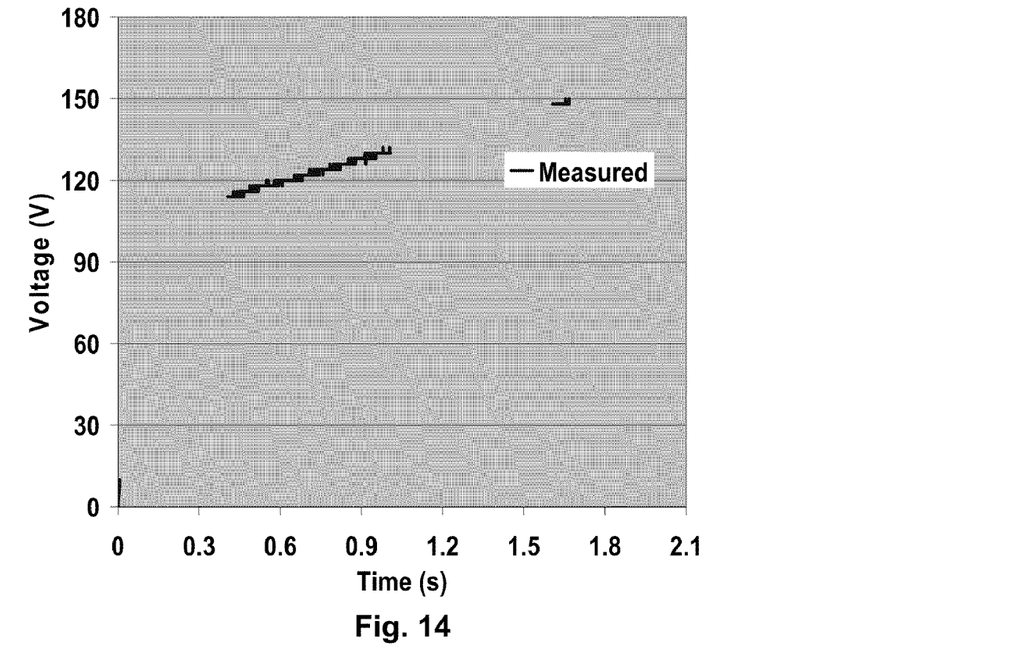
FIG. 14 is the charge curve of the capacitor test cell with a 10 mA charging current obtained using the electrolyte described in Example 15.
Figure 15:
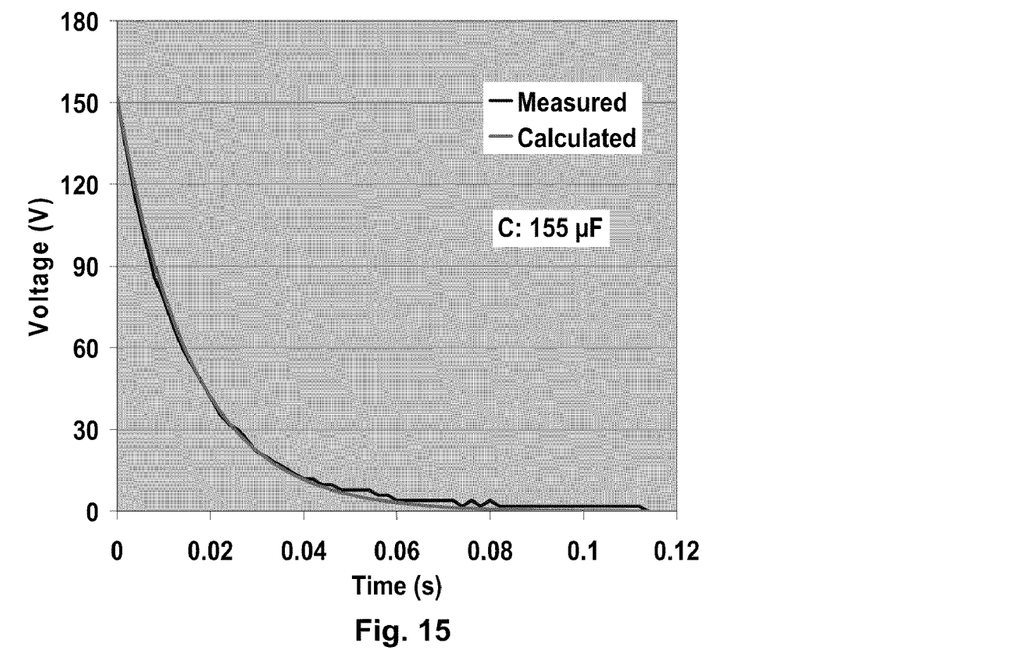
FIG. 15 is the discharge curve of the capacitor test cell through 100Ω as described in Example 15.

A capacitor was formed in the manner described in Example 13, except that the electrolyte was 4M $H_2SO_4$. The cell was charged to 150V at 10 mA in less then 1.8 seconds and discharged through a 100Ω resistor. The measured and calculated capacitance was 154 µF. The results are shown in FIGS. 14 and 15.

Example 16

Figure 16:
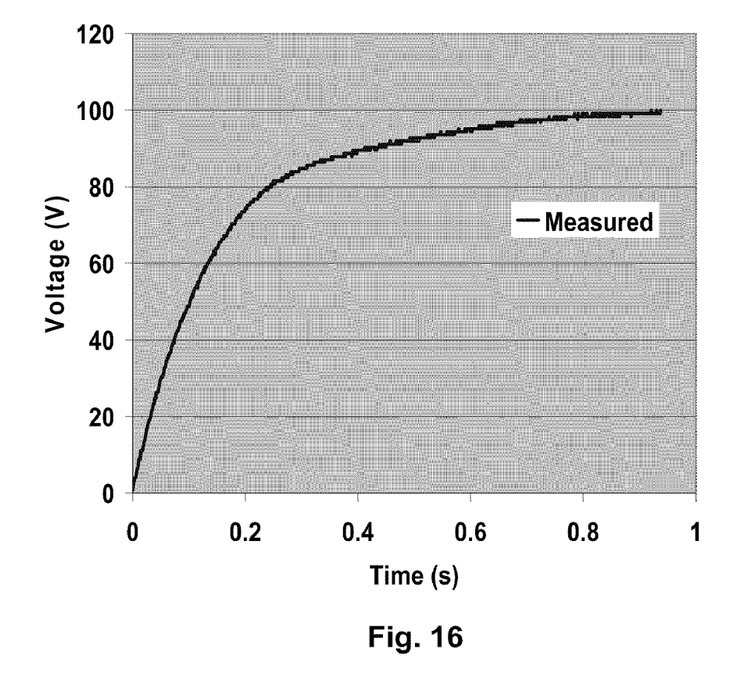
FIG. 16 is the charge curve of the capacitor test cell with a 10 mA charging current obtained using the electrolyte described in Example 16.
Figure 17:
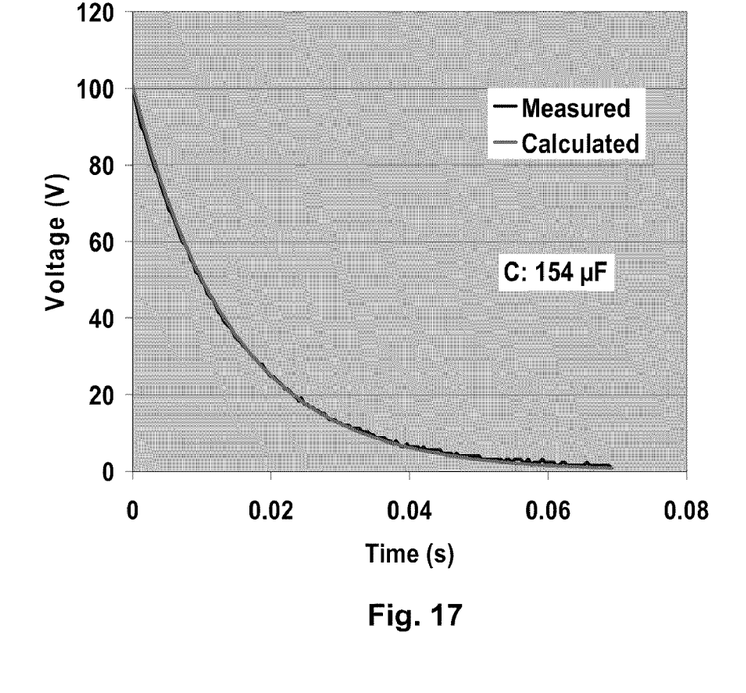
FIG. 17 is the discharge curve of the capacitor test cell through 100Ω as described in Example 16.

A capacitor was formed in the manner described in Example 13, except that the electrolyte was 4M $H_2SO_4$ and was gelled with 10 wt. % Cabosil (Cabot Corp.). The cell was charged to 100V at 10 mA in less then 1 second and discharged through a 100Ω resistor. The measured and calculated capacitance was 154 µF. The results are shown in FIGS. 16 and 17.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An electrolytic capacitor comprising:
   an anode comprising an anodically oxidized porous body, the porous body containing tantalum, niobium, or an electrically conductive oxide thereof;
   a cathode comprising a metal substrate; and
   a liquid electrolyte disposed between the cathode and the anode, wherein the electrolyte comprises a lithium salt selected from the group consisting of LiBr, LiI, LiSCN, $LiClO_4$, $LiBF_4$, $LiAsF_6$, $LiPF_6$, $LiCF_3SO_3$, $LiAlCl_4$, $LiC(CF_3SO_2)_3$, $LiPF_3(CF_3)_3$, $LiPF_3(C_2F_5)_3$, $LiBF_4$, $LiBF_3CF_3$, $LiBF_3(C_2F_5)$, $LiBF_3(C_3F_7)$, $LiN(CF_3SO_2)_2$, $LiN(C_2F_5SO_2)_2$, $LiN(CF_3SO_2)(C_4F_9SO_2)$, bis[trifluoromethane-sulfonyl]imidolithium (LiTFSI), and mixtures thereof, an ionically conductive polymer, and an organic solvent, wherein the liquid electrolyte has a viscosity of from about 10 to about 400 Poise, as determined at a temperature of 25° C. and a shear rate of 1 $sec^{-1}$.

2. The electrolytic capacitor of claim 1, wherein the ionically conductive polymer includes polyethylene oxide.

3. The electrolytic capacitor of claim 1, wherein the organic solvent includes a cyclic carbonic acid ester.

4. The electrolytic capacitor of claim 3, wherein the cyclic carbonic acid ester includes ethylene carbonate, propylene carbonate, butylene carbonate, or a mixture thereof.

5. The electrolytic capacitor of claim 1, wherein organic solvents constitute from about 50 wt. % to about 99 wt. % of the electrolyte.

6. The electrolytic capacitor of claim 1, wherein organic solvents constitute from about 70 wt. % to about 95 wt. % of the electrolyte.

7. The electrolytic capacitor of claim 1, wherein ionically conductive polymers constitute from about 0.1 wt. % to about 20 wt. % of the electrolyte.

8. The electrolytic capacitor of claim 1, wherein ionically conductive polymers constitute from about 0.5 wt. % to about 15 wt. % of the electrolyte.

9. The electrolytic capacitor of claim 1, wherein lithium salts constitute from about 0.5 wt. % to about 25 wt. % of the electrolyte.

10. The electrolytic capacitor of claim 1, wherein lithium salts constitute from about 1 wt. % to about 20 wt. % of the electrolyte.

11. The electrolytic capacitor of claim 1, wherein the electrolyte further comprises an additional polymer, which has a glass transition temperature of from about 10° C. to about 80° C.

12. The electrolytic capacitor of claim 11, wherein the additional polymer includes polyethylene carbonate, polypropylene carbonate, polybutadiene carbonate, polyvinylidene carbonate, or a combination thereof.

13. The electrolytic capacitor of claim 1, wherein the liquid electrolyte has a viscosity of from about 30 to about 200 poise, as determined at a temperature of 25° C. and a shear rate of 1 $sec^{-1}$.

14. The electrolytic capacitor of claim 1, wherein the metal substrate comprises titanium.

15. The electrolytic capacitor of claim 1, wherein an electrochemically-active material is disposed on the metal substrate.

16. The electrolytic capacitor of claim 15, wherein the electrochemically-active material includes a conductive polymer.

17. The electrolytic capacitor of claim 1, wherein the ionically conductive polymer includes one or more monomers that contain a hetero atom with a lone pair of electrons available for metal ions of the alkali metal salt to coordinate to and move therebetween.

18. The electrolytic capacitor of claim 1, wherein the ionically conductive polymer includes polyethylene oxide, poly(bis(methoxy-ethoxy-ethoxide))-phosphazene, a triol-type polyethylene oxide crosslinked with difunctional urethane, poly((oligo)oxyethylene)methacrylate-co-alkali metal methacrylate, polyacrylonitrile, polymethylmethacrylate, polymethylacrylonitrile, polysiloxanes, polyvinylidene fluoride or chloride, poly(chlorotrifluoro-ethylene), poly(ethylene-chlorotrifluoroethylene), poly(fluorinated ethylene-propylene), or a combination thereof.

* * * * *